United States Patent [19]

Baer

[11] 4,034,990

[45] July 12, 1977

[54] INTERACTIVE TELEVISION GAMING SYSTEM

[75] Inventor: Ralph H. Baer, Manchester, N.H.

[73] Assignee: Sanders Associates, Inc., Nashua, N.H.

[21] Appl. No.: 574,113

[22] Filed: May 2, 1975

[51] Int. Cl.$^2$ .................. A63F 7/06; G08B 5/22; H04N 7/18

[52] U.S. Cl. .................. 273/85 R; 273/DIG. 28; 340/324 AD

[58] Field of Search ............. 35/9 R, 9 A, 9 C, 9 B, 35/12 N, 11 A, 25; 273/1 E, 85 R, 101.1, 136 A, DIG. 28; 178/6.8, DIG. 35; 235/92 GA; 340/324 AD, 323 R

[56] References Cited

U.S. PATENT DOCUMENTS

| 3,002,801 | 10/1961 | Bomzer et al. | 360/79 |
| 3,486,242 | 12/1969 | Aronson | 35/11 A |
| 3,560,644 | 2/1971 | Petrocelli et al. | 35/25 |
| 3,562,415 | 2/1971 | Michels et al. | 178/6.8 X |
| 3,728,480 | 4/1973 | Baer | 178/6.8 |
| 3,778,058 | 12/1973 | Rausch | 273/1 E |
| 3,808,705 | 5/1974 | Schmoyer | 35/9 A |
| 3,874,669 | 4/1975 | Ariano et al. | 273/DIG. 28 |
| 3,921,161 | 11/1975 | Baer | 273/85 R X |
| Re. 28,598 | 10/1975 | Baer et al. | 273/85 R |

OTHER PUBLICATIONS

*Popular Electronics;* "Video Cartridges, Cassettes and Compatibility; Dec. 1972, p. 6.

Primary Examiner—Richard C. Pinkham
Assistant Examiner—Vance Y. Hum
Attorney, Agent, or Firm—Louis Etlinger; Richard Seligman

[57] ABSTRACT

Apparatus for playing games on the cathode ray tube screen of a television receiver or monitor is disclosed comprising a viewer/participant game control box of conventional design and having components for providing location controllable symbols on the screen and a prerecorded source providing additional symbols on the screen. The output from the prerecorded source is decoded and applied to the game control box such that the game control box can operate on the symbols generated by the prerecorded source in a manner which it normally performs on internally generated symbols whereby the internally generated symbols and the prerecorded symbols interact to provide a game playing capability.

17 Claims, 9 Drawing Figures

INTERACTIVE TELEVISION GAMING SYSTEM

BACKGROUND OF THE INVENTION

This invention relates to a television game, education and training system and more particularly to a system of this type wherein a viewer, by manipulating the controls of a control unit or game control box associated with a television receiver, TV monitor, or the like, can simulate various games and contests such as table tennis, hockey, bowling, target shooting, etc., such TV game activity being aided by the simultaneous display of prerecorded video data.

Television game and training systems are fairly recent innovations allowing television viewers to conduct various games and contests on their own television receivers, including TV monitors, independently of the transmitting station and other receivers. These systems include a game control unit connected to the antenna or video terminals of the television receiver or monitor. This control unit includes switches and electronic circuitry for the generation, manipulation and control of video signals. Using the existing electronics circuits within the television receiver or monitor, these video signals are displayed on the screen as location controllable symbols. By operating the controls of the control unit, one or more players can engage in various games, contests, training simulations and other activities. Examples of such systems are disclosed in U.S. Pat. Nos. 3,659,284; 3,659,285; 3,728,480; 3,778,058 and 3,829,095, all of which are assigned to the assignee of the present application and incorporated herein by reference.

The one drawback to these systems is that the viewers can interact, compete, etc., only with another viewer for most games thus limiting the use which can be made of the systems.

SUMMARY OF THE INVENTION

Accordingly, it is an object of this invention to add an additional dimension to presently available television game, educational and training apparatus.

It is another object of this invention to provide a television game system in which the individual participant/viewer can actually interact with a prerecorded program in a particular contest or game activity.

It is a further object of the invention to provide an interactive television game system in which a prerecorded video program can in effect, exercise control over some of the functions of a control unit attached to the viewer's TV set or monitor so that prerecorded video and other transmitted video information can interact with the viewer and "compete" during the progress of a game, contest or educational presentation.

It is yet another object of this invention to provide an interactive television game system which considerably extends the variety and complexity of the games compared to those that can be simulated on a television receiver or monitor when a cooperative program source is not available.

It is a still further object of this invention to provide a system which will display on a standard TV set or TV monitor, symbols such as squares, rectangles, simulated players (such as the players of a hockey team), etc. to depict the various components of a game, some of which components can be controlled directly by the viewer/participants, other of which may be controlled remotely by a participating television transmitting facility using prerecorded video programs or directly generated by video playback equipment at the viewer's location, also using previously recorded program material.

Briefly, the present system is an improvement upon the ones described in the aforesaid patents in that it permits prerecorded, video tape or disc material, to intereact with participating TV viewers on an individual basis during the conduct of a particular game, educational program or contest. The system is compatible with a standard television receiver or TV monitor to which is connected a television game control unit of the general type disclosed in the aforesaid patents. It is also compatible with video tape and disc play-back machines and associated monitors. Thus, all references to a transmitted signal can also be interpreted as meaning these combinations of video sources.

The cooperating transmitting facility using a video taped program or the home video play-back equipment, may provide a suitable background picture for the particular game being played at the television receiver, e.g., a roulette table, ice hockey rink, basketball court, etc. In addition, the prerecorded video program contains certain coded data signals representing the positions, identities, sizes or other characteristics of certain elements involved in the game, for example, in a hockey game, additional players may be provided on the viewer's screen. These coded signals are detected at the viewing end of the system, decoded and applied to the viewing players' control units so as to position or identify or otherwise affect certain elements or aspects of the simulated game. In other words, prerecorded video symbology can actively initiate and become "participants" in a game or contest being conducted by the players on their own television screens on an individual basis. Again referring to the example of a hockey game, the prerecorded signal might contain a pair of goalies which move randomly in front of their net. As far as the viewer/player is concerned, the difference between locally generated and this "synthetic", off-the-video tape or disc-symbology is merely that he only controls the positions of the locally generated symbols, the synthetic goalies being endowed with the capability of catching or rebounding a puck symbol just as if they were locally generated.

In one embodiment of the invention, the coded data signals are part of the composite video signal and are in fact the synthetic player symbols themselves, so that they are timed to occur in synchronism with the display of synthetic players on the television picture. These data signals are a characteristic of the type of prerecorded player video signals used. While they intensity-modulate the picture and therefore become visible on the TV screen, they are also decoded by special detecting (decoding) circuits responsive to the particular video modulation technique used to generate the displayed pattern or symbol. In one format of the present invention, this coded data is simply the transmitted "player" symbols, which are caused to be at maximum white level, allowing them to be "sliced off" in the decoder, all other video signals being restrained from exceeding, say, 80% modulation. In the second format of this invention, player symbols are "coded" by giving them a color component (say red or blue) different from all other symbology, thus allowing "decoding" by standard chroma demodulator techniques.

These "decoded" signals can be used to develop logic level signals which are identically time-related to those of the synthetic player locations in the TV raster. They can, therefore, be used as logic signals indicating such things as coincidence between prerecorded and locally generated player symbols.

The logic circuitry associated with viewing player's game control box uses these logic signals and applies them to the game circuits connected to the viewing player's TV receiver or monitor.

With the present system, a variety of interactive activities can be simulated. For example, in a batting practice game, the prerecorded, coded signals representing the baseball are decoded and applied to the control unit at the viewer's location to identify the instantaneous positions of the "baseball" spot as it moves across the screen with a given trajectory. The viewer, by manipulating the controls on his control unit, tries to move a "bat" symbol to "hit" the ball "spot". If there is an intercept between the bat and ball, the transmitted control voltage "steering" the baseball will be removed and the ball will travel in the general direction from which it was hit in much the same manner as the table tennis ball spot described in said U.S. Pat. No. 3,659,284.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

The basic concept underlying the present invention for a cooperative TV game system is that of prerecording video signals suitable for playback into a TV receiver or monitor; such signals having not only background, pictorial content desirable for a particular game, but, additionally, having actively moving "player" symbols. These player symbols, in turn, have recognizable characteristics allowing circuitry common to the television art to extract them from surrounding video signals so that the player symbols can be combined with other signals locally generated in the viewers game generating and control circuits, in accordance with the teachings of aforementioned patents.

Figure 1:
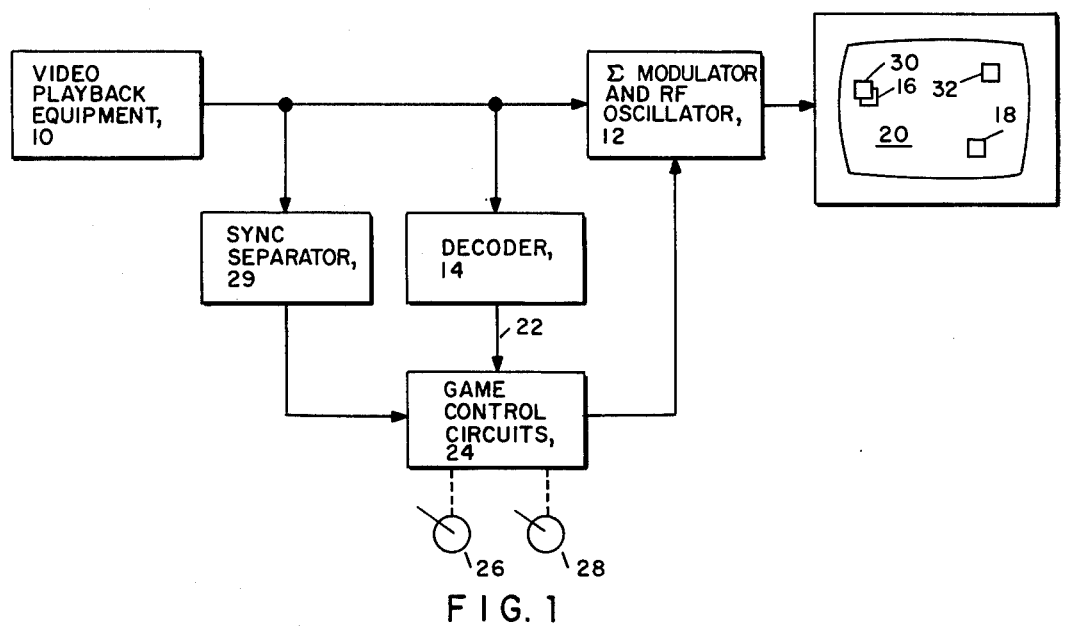
FIG. 1 is a block diagram of one embodiment of the invention wherein a prerecorded video source and a game control box provide a composite display on a TV receiver or monitor.

Reference to FIG. 1 of the drawings shows the elements of such a system. Video playback equipment 10 is a video disc or tape reproducing machine delivering a standard monochrome or color composite video and sync signal. This signal is applied to a summer, modulator and RF oscillator 12 and to a decoder 14, which extracts player-symbol pulses from the video signal; such player-symbol pulses being essentially time-related to their visual appearance as symbols 16 and 18 on a TV screen 20. Decoder output 22 applies these signals to the appropriate section of game control circuits 24 and its associated hand-controls 26 and 28. These are set forth in detail in the aforementioned patents and provide interaction between locally generated player symbols and symbols provided by the video playback equipment. Such interaction might consist of sensing co-location (coincidence) on screen of two such symbols (representing, for example, a player and a ball) and a generation of a logic command to "bounce" the ball symbol "off" the player. The hand controls 26, 28 allow manipulation of locally generated player symbols 30 and 32, i.e., allowing them to be manually moved over the areas of the TV screen in accordance with the rules of the game being played. Synchronization signals for the game control circuits 24 are derived from the recorded signal via a sync separator 29. These locally generated player symbols 30 and 32, as well as other symbology, such as playing field borders, goals, etc., leave the game control circuits 24 and are applied to summer 12 so that they appear overlaid on the video background and the synthetic players symbols derived from video playback equipment 10, thus fulfilling the requirements underlying this invention of allowing interactive games between synthetic, or prerecorded player-symbols and locally-generated symbology.

Figure 2:
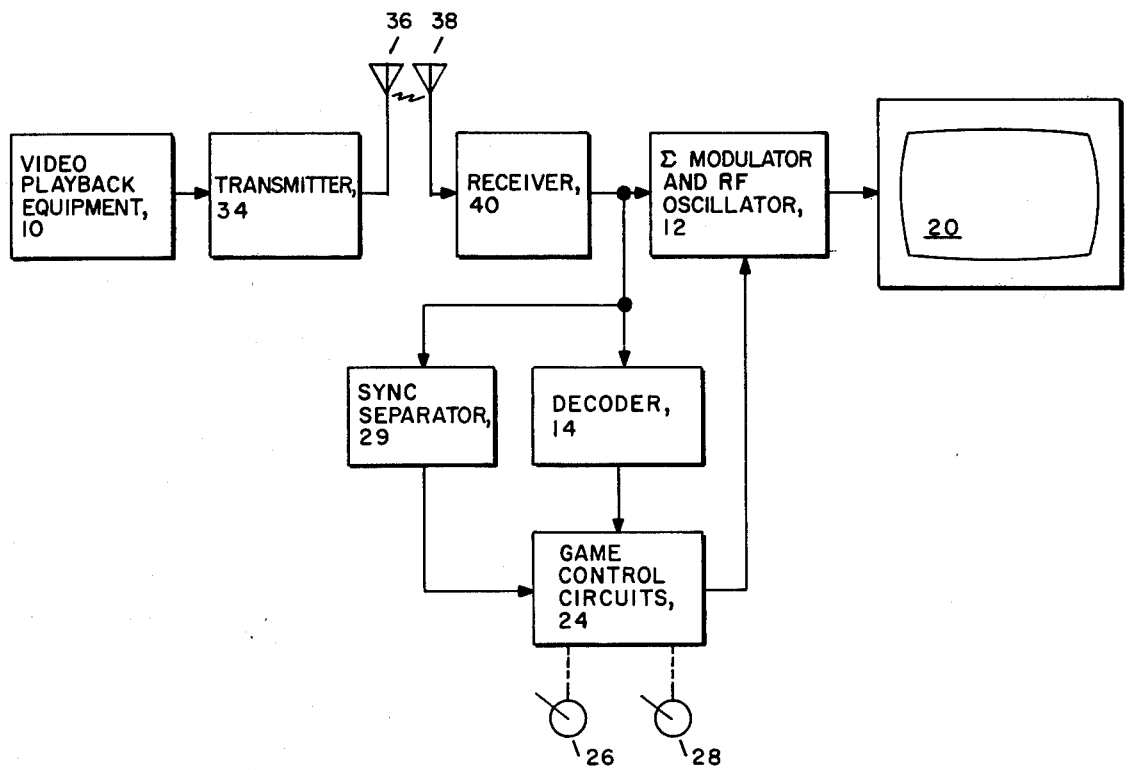
FIG. 2 is a block diagram of an embodiment of the invention similar to FIG. 1 but employed in cooperation with a broadcast or cable TV station.

Referring now to FIG. 2 of the drawings, it may be seen that the system of FIG. 1 can be expanded by interjecting a transmitter 34, a transmission link including antennas 36 and 38 and receiver 40, between the video playback equipment 10 and the viewing end elements 14, 24, 12 and 20 shown both in FIGS. 1 and 2. This modified arrangement permits the broadcasting of prerecorded video game material, further enhancing the scope of TV game systems without requiring the possession and use of a video playback disc or tape machine at the (home) viewer's location. A direct (cable) connection can be made between transmitter 34 and receiver 40 instead of antennas 36, 38 for cable transmission of the prerecorded video game material for CATV and other applications.

Figure 3:
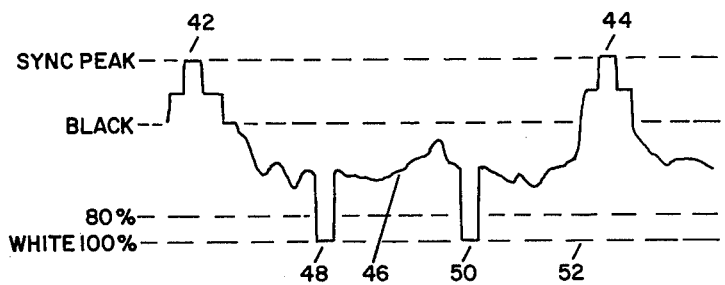
FIG. 3 is an illustration of a monochrome composite video and sync waveform representative of that generated by the video playback equipment in the systems of FIGS. 1 and 2.

FIG. 3 of the drawings depicts one horizontal line of a standard video signal. Note horizontal sync pulses 42 and 44, background video signal 46 and two "synthetic" player symbols 48 and 50. Note also that all video content does not exceed an amplitude of approximately 80% of maximum white level 52, while player-symbol signals 48 and 50 reach 100% white level, thus identifying, or coding, the latter signals and enabling their later extraction, or decoding by level sensitive slicer circuitry. This method of decoding will be termed the white level slicing technique and is one embodiment of decoder 14.

Figure 4:
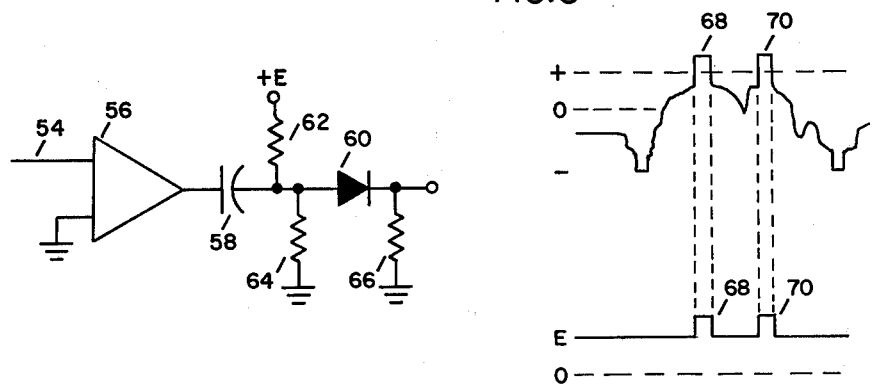
FIG. 4 is a circuit of a decoder employed in the system of FIGS. 1 and 2 and typical waveforms illustrating operation of the decoder.

FIG. 4 shows one method for accomplishing this white level slicing circuit function. In this method, composite video and sync signals 54 is amplified by a video gain stage 56 and applied through a capacitor 58 to a diode 60. Diode 60 is backbiased by a pair of resistors 62 and 64 to a voltage E and connects to an output load resistor 66, such that only peak signals exceeding voltage E can pass through diode 60. Therefore only pulses 68 and 70 of the composite video signal shown below the circuit appear across load resistor 66, thus effecting the decoding function of the prerecorded player symbols and providing a pulse waveform essentially time-related to the corresponding synthetic player symbol 16 and 18 shown previously in FIG. 1. The extracted pulses are shown in the waveform below the composite video signal. The circuit shown in FIG. 4 is only representative of a typical white level slicing decoder effectively employed in a reduction to practice of the present invention and other circuits would be readily known to those persons skilled in the art.

Figure 5:
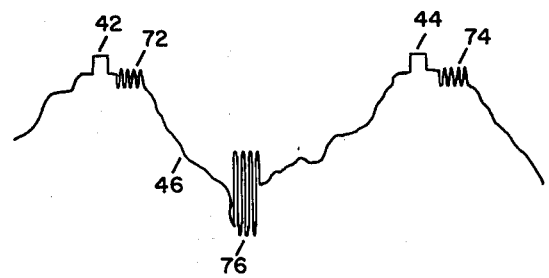
FIG. 5 is an illustration of a color composite video and sync waveform representative of another signal generated by the video playback equipment in the systems of FIGS. 1 and 2.
Figure 6:
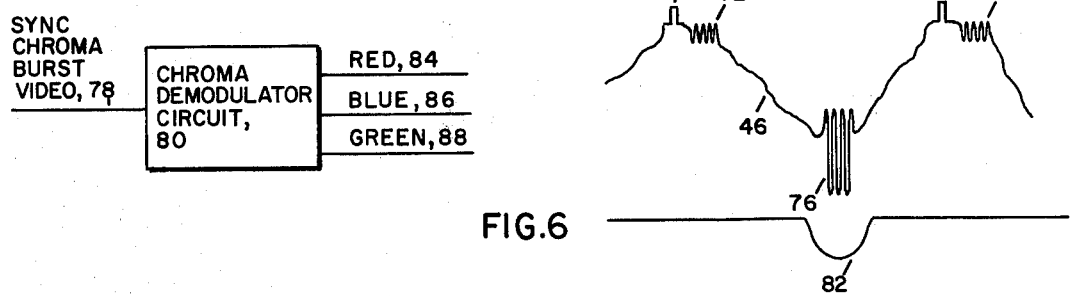
FIG. 6 is a block diagram of another decoder employed in the systems of FIGS. 1 and 2 and typical waveforms illustrating operation of the decoder.

An alternate decoding method is depicted in FIG. 5. Assume the availability of a prerecorded, color TV signal source having the general characteristics of FIG. 5 in which the video signal includes horizontal sync pulses 42 and 44, the video (background) signal 46, the standard chroma signal reference bursts 72 and 74 (8 cycles in current U.S. practice), and a chroma signal burst 76 corresponding in position to a prerecorded player symbol on the TV screen, and having a phase relative to chroma bursts 72, 74 which is associated with the color of signal burst 76. It can thus be seen, that player symbol (burst) 76 is uniquely tagged, or coded, and readily separated from background video signals by circuits which are sensitive to the color (chroma phase) of the player symbol. Such a circuit is indicated by the decoder of FIG. 6; this figure shows composite color TV signal 78 applied to a chroma demodulator circuit 80. The latter is identical to any one of many chroma demodulator circuits used in present-day TV receivers and generally available as a single-chip (LSI) integrated circuit from many semiconductor manufacturers.

Referring to the waveforms of FIG. 6, it can be seen that the presence of a player spot of a given color will result in pulse output 82 from one of the color outputs 84, 86 and 88 of demodulator or decoder 80. This pulses is the desired, decoded player-symbol, ready for use as an input to the logic section of the viewer/participants' game control box 24 of FIGS. 1 and 2. This system for coding and decoding prerecorded symbology is referred to as the chroma signal coding method.

Figure 7:
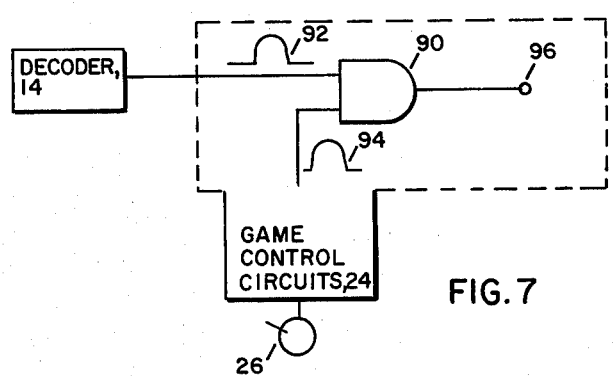
FIG. 7 is a block diagram of a circuit in the game control box of FIGS. 1 and 2 illustrating interaction between a player generated symbol and a symbol decoded from a prerecorded source.

FIG. 7 of the drawings depicts an elementary block diagram description of a typical use of a decoded player symbol in accordance with the teachings of the aforementioned patents. It is seen that decoder 14 applies its pulse output to an AND-gate 90. Hand control 26 causes a game control circuits 24 to produce a player symbol pulse output which is also applied to AND gate 90. When both the demodulated player symbol signal 92 and that of the locally generated player symbol signal 94 enter AND gate 90 coincident in time, the AND gate delivers a logic signal at terminal 96. This logic signal can then be utilized in a variety of ways as described in the aforementioned patents, for example, it may be used to blank one of the players so that it disappears from view.

Figure 8:
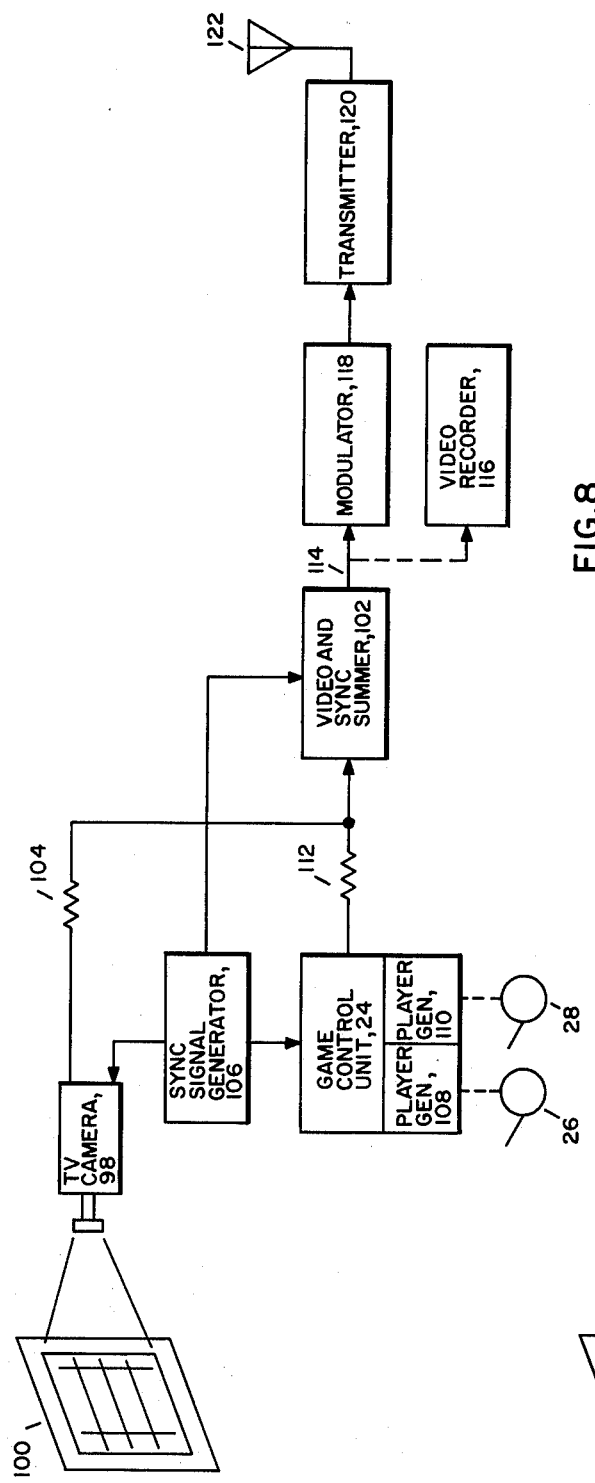
FIG. 8 is a block diagram of one embodiment for prerecording a monochrome tape or disc used in the systems of FIGS. 1 and 2.
Figure 9:
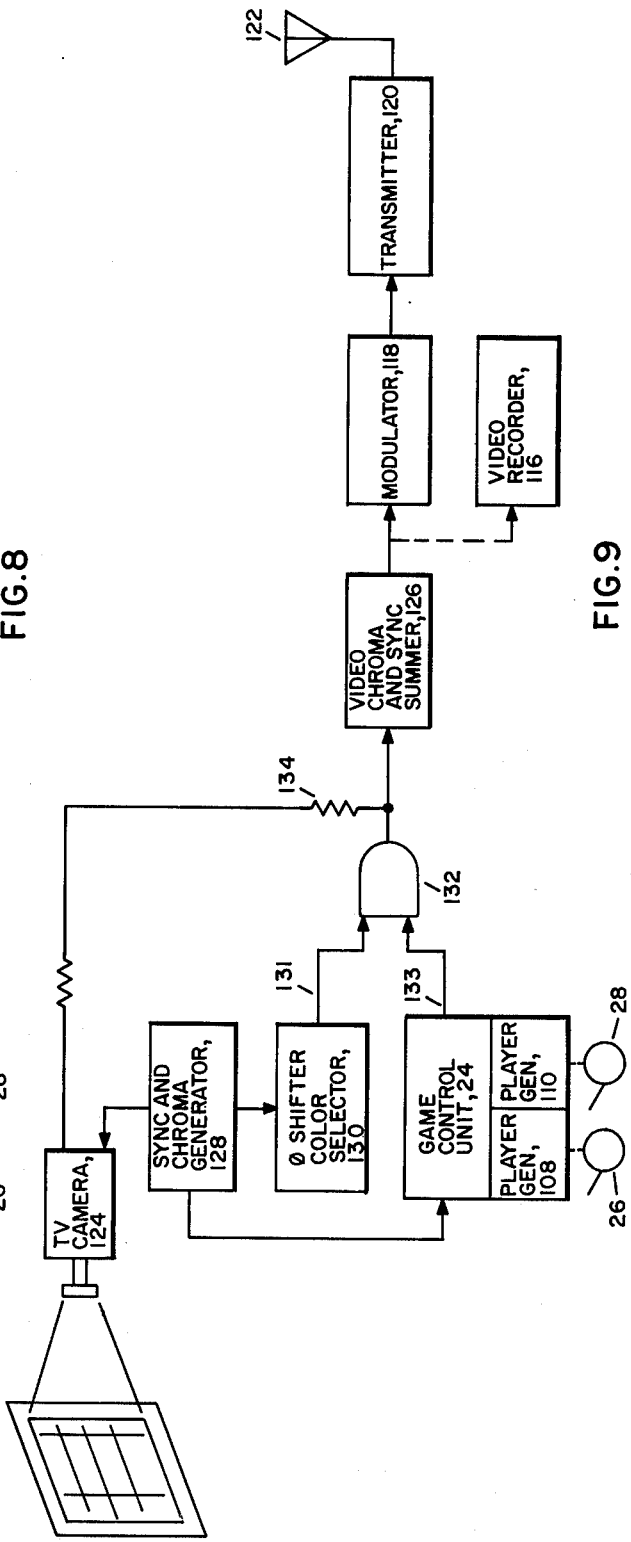
FIG. 9 is a block diagram of one embodiment for prerecording a color tape or disc used in the systems of FIGS. 1 and 2.

FIGS. 8 and 9 are block diagrams of the equipment and methods used to produce cooperative video programs which may be recorded for later playback via prerecorded video disc or tape. FIG. 8 describes a system using white level coding; while FIG. 9 shows a system employing chroma signal coding.

Returning to FIG. 8 of the drawings, a TV camera 98 is shown picking up an image of background scenery from a drawing 100 and applying its signal to a video-and-sync-summer 102 through a scaling resistor 104. A sync generator 106 provides synchronization and blanking signals in the customary fashion of the TV art to various elements of the system including the camera 98, game control unit 24 and summer 102. A game control unit 24 is shown, having within it two player generators 108 and 110, whose outputs are controlled by hand controls 26 and 28. Game control unit 24 delivers all required game symbology to video and sync summer 102 through a resistor 112. Therefore, the output 114 of summer 102 contains both camera generated background video information as well as passive and active symbology supplied by game control unit 24. Examples of such symbology are players and goalies of a simulated hockey game. Output signal 114 is shown to be used in one of two ways: It is applied to a video recorder 116 for the purpose of making a recording; or it is transmitted directly via a broadcast modulator 118 and transmitter 120 via an antenna 122 to viewers equipped with a receiving system of the type shown in FIG. 2. Alternatively, the output signal may be cablecast to viewers in the conventional manner.

FIG. 9 of the drawings shows a similar system and methods used to produce prerecorded tape or transmit cooperation TV game programs in color using the chroma coding method of FIGS. 5 and 6. Color camera 124 provides an output of background scenery 100 which is applied to video, chroma and sync summer 126. Synchronization signals and a chroma reference signal is supplied by generator 128. The reference chroma signal from generator 128 is applied to a phase shifter 130. The preset adjustment of phase shifter 130 results in a chroma signal 131 corresponding to a particular color. This chroma signal is applied to an AND gate 132 along with an output 133 from game control unit 24. As a result, player symbology 133 gates the chroma signal 131 such that AND gate 132 releases bursts of appropriately phase-shifted chroma signal. These are added in summer 126 via a resistor 134 to camera 124 generated video. The output of summer 126 can now be recorded or it can be transmitted, or both as in the case described with reference to FIG. 8.

In the embodiments illustrated the summed signals are always shown in conjunction with a modulator and rf oscillator, however, as is well known, the signals could be applied to a video input to the receivers if these were readily available, for example, by a jack on the receiver. Without a video input jack, it is preferable that the video signals modulate an rf carrier to allow connection to the available rf input so that a user does not have to make any connections inside the receiver nor require any changes be made to the receiver. Thus, it is to be understood that the embodiments shown are to be regarded as illustrative only, and that many variations and modifications may be made without departing from the principles of the invention herein disclosed and defined by the appended claims.

I claim:

1. An interactive game system including game control circuits for generating signals representing location controllable symbols to be displayed on the screen of a cathode ray tube display and means for applying the output from said game control circuits to a raster scan cathode ray tube display, wherein the improvement comprises:
   a source of prerecorded video signals to provide symbols; and
   means for coupling said source of prerecorded video signals to said game control circuits so as to interact with the signals generated by said game control circuits.

2. The apparatus defined in claim 1 wherein said source of prerecorded video signals includes coded data signals representing symbols to be displayed on the screen of a cathode ray tube display.

3. The apparatus as defined in claim 2 wherein said coupling means includes means for decoding said coded data signal to provide interaction between the location controllable symbols generated by said game control circuits and symbols generated by said source of prerecorded video signals.

4. The apparatus as defined in claim 3 wherein the prerecorded video coded data signals are pulses generated at a maximum white level with said decoding means including means for level-slicing said prerecorded video signal to detect said pulses.

5. The apparatus defined in claim 3 wherein the prerecorded-video coded data signals are chroma signal bursts of a predetermined color with said decoding means including a chroma demodulator circuit.

6. The apparatus defined in claim 3, further including means for interacting said signals from said game control circuits with said decoded coded data signals providing interaction between said location controllable symbols and other symbols generated by said prerecorded video source on the screen of a cathode ray tube.

7. The apparatus defined in claim 6 wherein said means for interacting includes means for ascertaining coincidence between said location controllable symbols and said other symbols.

8. The apparatus as defined in claim 1 wherein said coupling means includes a transmitter coupled to said source of prerecorded video signals and a receiver coupled to said game control circuits.

9. An interactive game system, comprising:
   means for generating video signals representing a symbol for display on the screen of a cathode ray tube;
   means for generating vertical and horizontal sync signals;
   means for transmitting composite video signals including said sync signals and said video signals;
   a receiver;
   a cathode ray tube display;
   a control unit coupled to said receiver and to said cathode ray tube, said control unit including one or more symbol generators for generating video signals representing one or more symbols for display on the screen of said cathode ray tube display, and means for applying the transmitted video signals representing a symbol to the control unit so that the transmitted symbol interacts with the symbols generated within the control unit.

10. The system defined in claim 1 wherein the video signal generating means comprise a second control unit including one or more symbol generators for display of one or more symbols on the cathode ray tube display.

11. The system defined in claim 10 wherein the video signal generating means further includes a television camera for developing video signals representing a background picture.

12. An interactive game system, comprising:
   means at a first location for generating horizontal and vertical television sync signals;
   means at said first location for generating first video signals representing one or more symbols for display and maneuvering on the screen of a raster scan cathode ray tube display which are time-related to the sync signals;
   a control unit at a second location remote from the first and responsive to the sync signals for generating second video signals representing one or more symbols for display and maneuvering on the screen of said cathode ray tube display;
   a raster scan cathode ray tube connected to receive said sync signal and said first and second video signals;
   means for transmitting the first video and sync signals from said first location to said control unit location; and
   means for applying the sync signals and said first video signals to said control unit so that the symbols generated by the unit interacts with the symbols generated at said first location.

13. The system defined in claim 12 wherein first video signal generating means develop signals timed with relation to the sync signals and arranged to have a maximum video (white) level with all other video signals held below that level by a definite margin, and said applying means include means coupled to the receiver for detecting signals of maximum white level.

14. Apparatus for generating a prerecorded video program suitable for use by at least one game control unit, comprising:
   means for generating horizontal and vertical synchronization signals;
   a game control unit coupled to said means for generating synchronization signals, said game control unit including means for varying the output signal from said game control unit to generate coded signals suitable for interaction with signals generated by another game control unit; and
   means for recording the output from said game control unit and said synchronization signals on a recording medium.

15. The apparatus of claim 14, further including a television camera for providing background information and means for summing the output from said television camera with the output from said game control circuit and said synchronization signals.

16. The apparatus of claim 14 wherein the amplitude of the output signal and said game control circuit is adjusted to provide a maximum white level.

17. The apparatus of claim 14, further including a chroma generator, a phase shifter coupled to said chroma generator for providing color selection and means for ANDing the output signal from said game control unit with the output from said phase shifter.

* * * * *

UNITED STATES PATENT OFFICE
CERTIFICATE OF CORRECTION

PATENT NO. : 4,034,990
DATED : July 12, 1977
INVENTOR(S) : Ralph H. Baer

It is certified that error appears in the above-identified patent and that said Letters Patent are hereby corrected as shown below:

Column 5, Line 51, change "pulses" to --pulse--

Claim 10, Line 1, change "1" to --9--

Signed and Sealed this

Twenty-sixth Day of February 1980

[SEAL]

Attest:

SIDNEY A. DIAMOND

Attesting Officer     Commissioner of Patents and Trademarks